(12) United States Patent
Kruse

(10) Patent No.: US 10,329,039 B2
(45) Date of Patent: Jun. 25, 2019

(54) DEVICE FOR IMPROVING PERFORMANCE OF BIOWASTE HOPPER AND RELATED METHODS OF USE

(71) Applicant: Randy Kruse, Storm Lake, IA (US)

(72) Inventor: Randy Kruse, Storm Lake, IA (US)

(*) Notice: Subject to any disclaimer, the term of this patent is extended or adjusted under 35 U.S.C. 154(b) by 56 days.

(21) Appl. No.: 15/655,395

(22) Filed: Jul. 20, 2017

(65) Prior Publication Data

US 2018/0022479 A1 Jan. 25, 2018

Related U.S. Application Data

(60) Provisional application No. 62/364,614, filed on Jul. 20, 2016.

(51) Int. Cl.
| | | |
|---|---|---|
| *B65B 3/04* | (2006.01) | |
| *B65B 3/18* | (2006.01) | |
| *B01D 35/02* | (2006.01) | |
| *B09B 1/00* | (2006.01) | |
| *B65F 1/10* | (2006.01) | |

(52) U.S. Cl.
CPC ............. *B65B 3/04* (2013.01); *B01D 35/02* (2013.01); *B09B 1/00* (2013.01); *B65B 3/18* (2013.01); *B65F 1/10* (2013.01)

(58) Field of Classification Search
CPC ..... B65B 3/04; B65B 3/18; B65F 1/10; B09B 1/00; B01D 35/02
USPC ............. 210/257.1, 259–262, 255, 256, 248, 210/172.1, 172.6, 337, 342, 315, 513, 210/532.1, 538
See application file for complete search history.

(56) References Cited

U.S. PATENT DOCUMENTS

| | | |
|---|---|---|
| 3,995,734 A | 12/1976 | Berg, Jr. |
| 4,077,509 A | 3/1978 | Berg, Jr. |
| 4,304,516 A | 12/1981 | Schmidt et al. |
| 4,740,127 A | 4/1988 | Galgana et al. |

(Continued)

FOREIGN PATENT DOCUMENTS

| | | |
|---|---|---|
| DE | 2847016 A1 | 5/1980 |
| DE | 19949712 A1 | 4/2001 |

(Continued)

OTHER PUBLICATIONS

International Searching Authority, "Search Report and Written Opinion," issued in connection with International Patent Application No. PCT/US2017/043093, dated Sep. 29, 2017, 9 pages.

(Continued)

*Primary Examiner* — Madeline Gonzalez
(74) *Attorney, Agent, or Firm* — Nyemaster Goode P.C.

(57) ABSTRACT

The present disclosure generally relates to an apparatus for filling a biowaste tank having an inner body with first and second ends. The first end receives biowaste and the second end directs the biowaste into a tank. The apparatus has an outer body with first and second ends. The first end receives overflow and the second end is flush with the second end of the inner body, and the outer body fully encompasses the inner body. The apparatus has a first pipe with an inlet configured to attach to the tank and an outlet in the inner body, and a second pipe with an inlet in the outer body, and an outlet in the tank, the pipe configured to direct overflow biowaste from the inner body into the tank through a second aperture in the tank.

19 Claims, 6 Drawing Sheets

(56) References Cited

U.S. PATENT DOCUMENTS

| | | | |
|---|---|---|---|
| 4,832,267 A | 5/1989 | Meek | |
| 4,850,403 A * | 7/1989 | Wiese | B67C 11/02 |
| | | | 141/95 |
| 5,033,519 A | 7/1991 | Puffer et al. | |
| 5,199,363 A | 4/1993 | Cheetham | |
| 5,381,923 A | 1/1995 | O'Dea | |
| 6,186,428 B1 * | 2/2001 | Robinson | B02C 19/0075 |
| | | | 241/100 |
| 7,089,684 B2 | 8/2006 | Genier | |
| 8,894,271 B2 | 11/2014 | Rumph | |
| 8,919,572 B1 * | 12/2014 | Westaby | B01D 35/28 |
| | | | 210/167.18 |
| 2007/0144606 A1 | 6/2007 | O'Brien | |
| 2007/0197852 A1 | 8/2007 | Wilson et al. | |
| 2010/0019072 A1 | 1/2010 | Nuhn | |
| 2013/0047866 A1 | 2/2013 | Grady et al. | |
| 2013/0164177 A1 | 6/2013 | Sampson | |

FOREIGN PATENT DOCUMENTS

| | | |
|---|---|---|
| JP | 8068102 | 3/1996 |
| RU | 104100 | 5/2011 |
| WO | 2007015598 A1 | 2/2007 |
| WO | 2009071053 A2 | 6/2009 |

OTHER PUBLICATIONS

KWS Environmental, "Environmental Load-Out Systems," Product Description Page, Retrieved from http://www.kwsmfg.com/kws-environmental/load-out-system.htm, last accessed Apr. 12, 2016, 4 pages.

Scholten's Equipment, "2015 Jamesway Truck Mount Spreader Tanks," Product Description Page, Retrieved from http://www.scholtensequipment.com, last accessed Apr. 12, 2016, 4 pages.

Vulcan Systems, "Vulcan Chicken Manure Drying System," Product Description Page, Retrieved from http://www.getavulcan.com, last accessed Apr. 12, 2016, 2 pages.

* cited by examiner

DEVICE FOR IMPROVING PERFORMANCE OF BIOWASTE HOPPER AND RELATED METHODS OF USE

CROSS-REFERENCE TO RELATED APPLICATION

This application claims priority to and the benefit of U.S. Provisional Patent Application Ser. No. 62/364,614, filed on Jul. 20, 2016, entitled "DEVICE FOR IMPROVING PERFORMANCE OF BIOWASTE HOPPER AND RELATED METHODS OF USE," the disclosure of which is hereby incorporated herein by reference in its entirety.

BACKGROUND

Biosecurity issues are a very real threat facing the United States. Infectious diseases can be carried from farm to farm by people, animals, equipment, or vehicles. Disease outbreaks have widespread impact, including human health risks and significant damage to the domestic livestock and poultry industries. UNITED STATES DEPARTMENT OF AGRICULTURE: ANIMAL AND PLANT HEALTH INSPECTION SERVICES, *Biosecurity: Protecting Your Livestock and Poultry*, in SAFEGUARDING AMERICAN AGRICULTURE (March 2007). This damage can include animal deaths, reduced productivity, and increased treatment, labor, and management costs. For example, in 2002-2003, a disease outbreak in the poultry industry resulted in the destruction of more than four million birds and cost taxpayers more than 170 million dollars to eradicate. Id. Porcine reproductive and respiratory syndrome (PRRS) virus is estimated to cost the U.S. swine industry over 600 million dollars per year. R. B. BAKER, *Exploring the Science Behind Biosecurity and PRRS*, NATIONAL HOG FARMER (April 2012). The United States has also faced foot-and-mouth disease, an infectious and sometimes fatal virus that has world-wide presence, nine times since 1870. A. E. SEGARRA AND J. M. RAWSON, *Foot and Mouth Disease: A Threat to U.S. Agriculture*, CRS REPORT TO CONGRESS (April 2001). The most serious outbreak spread to 22 states and lead to the slaughter of over 172,000 cattle, sheep, and swine. Id. One of the greatest biosecurity risks is farm equipment that has been in contact with livestock or manure and then moves between farms or on shared roads. UNITED STATES DEPARTMENT OF AGRICULTURE.

Modern approaches to biosecurity include both bioexclusion (preventing disease agent entry into a population) and biomanagement (efforts to control and manage diseases that are already present); however both of these methods are fairly susceptible to human failure. BAKER. As a result, focus on biocontainment is important for preventing the escape of disease agents to neighboring farms and new livestock populations. BAKER. In light of the potential for tremendous financial loss to producers associated with the transfer of biohazards, there is a need in the art for low-cost and effective containment methods to prevent the spread of human and animal diseases.

SUMMARY OF THE PRESENT DISCLOSURE

One aspect of the current invention includes an apparatus for filling a biowaste tank. The apparatus has an inner body with a first end and a second end. The first end receives biowaste and the second end directs the biowaste into a tank. The apparatus has an outer body with a first end and a second end. The first end receives biowaste overflow from the inner body and the second end is flush with the second end of the inner body, and the outer body fully encompasses the inner body. The apparatus has a flange used to fasten the second end of the inner body, the second end of the outer body, and the tank opening, a first pipe with an inlet configured to attach to the tank and an outlet in the inner body, and a second pipe with an inlet in the outer body, and an outlet in the tank, the pipe configured to direct overflow biowaste from the inner body into the tank through a second aperture in the tank.

Another aspect of the present disclosure includes a hopper for improving inflow of biowaste into a tank having a body assembly, the body assembly having an inner body with a first end to receive biowaste and a second end to direct biowaste into a tank, wherein the inner body has a substantially square cross-section. The body assembly has an outer body fully encompassing the inner body and has a substantially square top portion, having a first end to receive biowaste overflow from the inner body and a second end flush with the second end of the inner body. The body assembly has a flange used to fasten the second end of the inner body and the second end of the outer body to the tank. The hopper also has a pipe with an inlet in the body assembly, and an outlet attached to the tank, the pipe configured to direct overflow biowaste from the inner body into the tank through a second aperture in the tank, and a strainer basket operably coupled to the body assembly and removably disposed within the inner body.

Yet another aspect of the present disclosure includes a method for filling a biowaste tank having the steps of directing biowaste into an aperture in the top of a biowaste tank with an inner body, catching an amount of overflow biowaste from the inner body with an outer body that substantially surrounds the inner body, directing the amount of overflow biowaste into the tank through a pipe having an inlet in the outer body and an outlet configured to attached to the tank, and increasing the air flow through the tank and decreasing the backflow of the biowaste.

These and other aspects, objects, and features of the present invention will be understood and appreciated by those skilled in the art upon studying the following specification, claims, and appended drawings.

DETAILED DESCRIPTION

Figure 1:
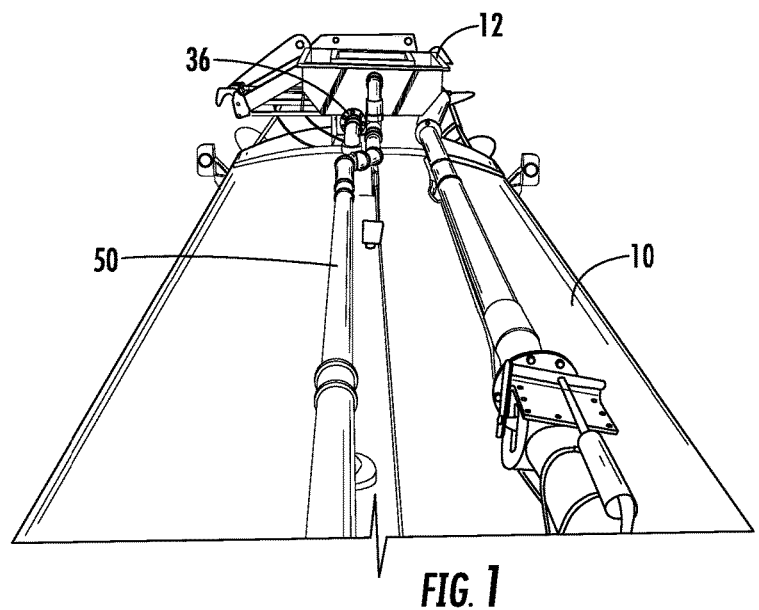
FIG. 1 is a perspective view looking rearward toward the biohopper from the cab of tractor trailer of the present disclosure.
Figure 2:
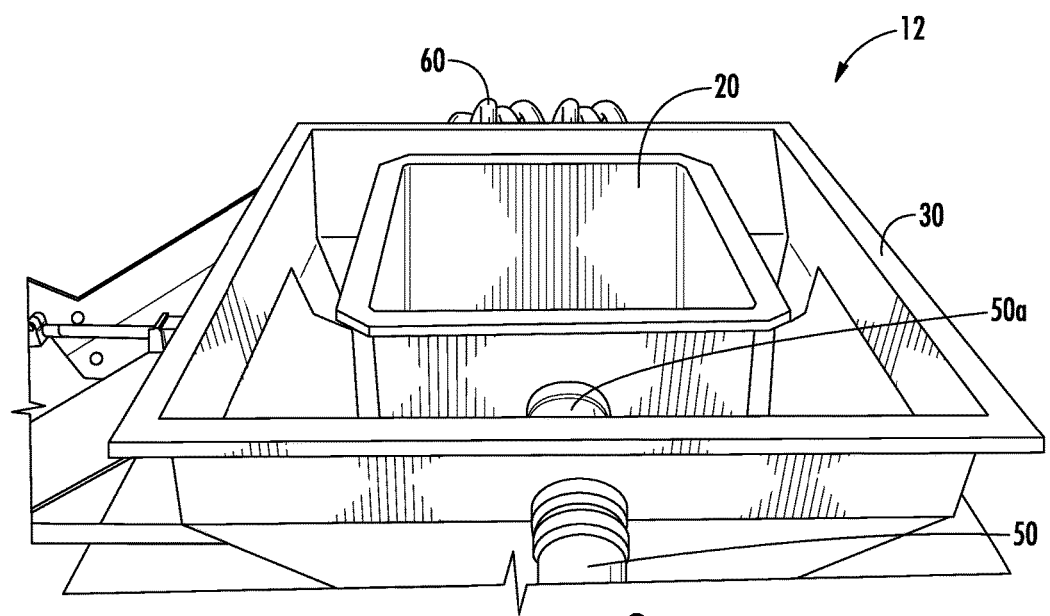
FIG. 2 is a perspective view looking rearward toward the biohopper of the present disclosure.
Figure 3:
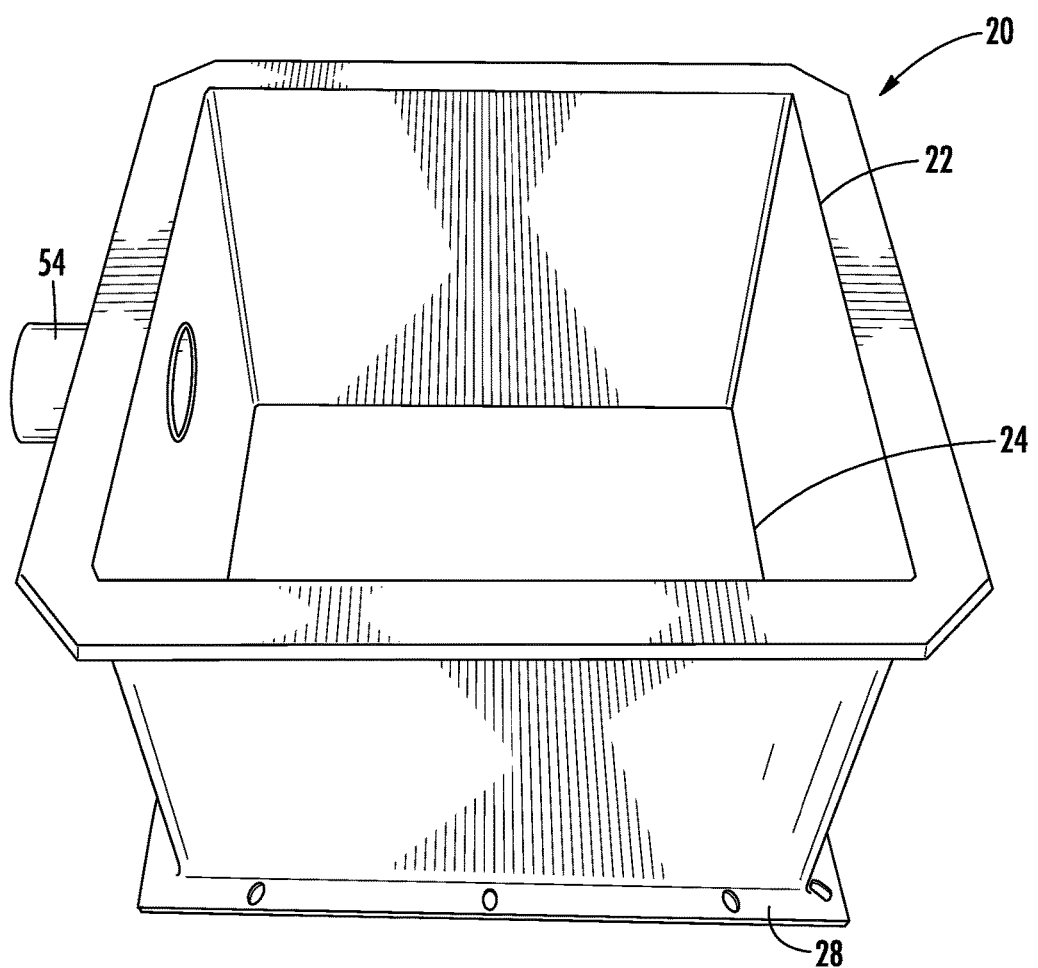
FIG. 3 is a perspective view of the inner body of the biohopper of the present disclosure.
Figure 4:
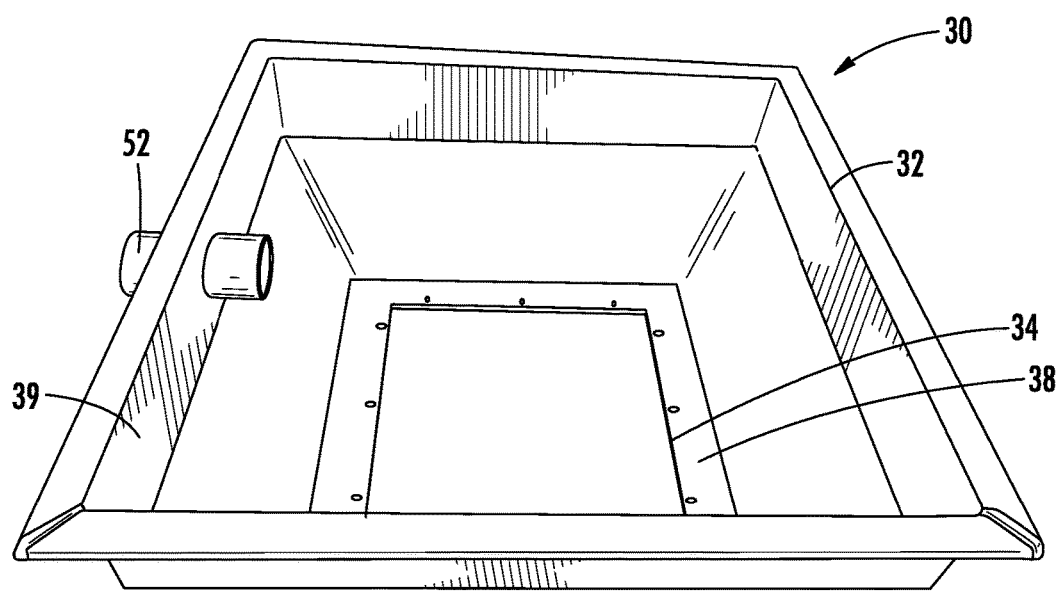
FIG. 4 is a perspective view of the outer body of the biohopper of the present disclosure.
Figure 5:
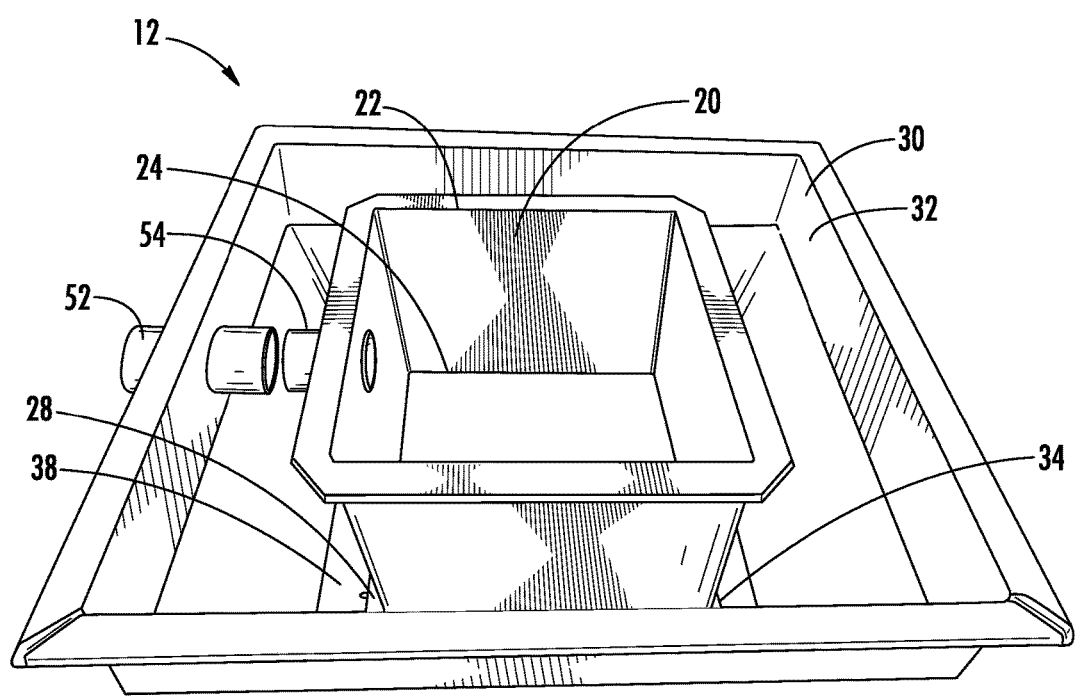
FIG. 5 is a view of the inner body and outer body of the biohopper of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure generally relates to a device, system, and methods for improving the performance of a biowaste hopper, and more particularly to a biowaste hopper that reduces tank overflow, thus decreasing biosecurity concerns associated with spillage and biohazardous material tracking by farm equipment. One benefit is reduced overflow of biowaste funneled into the hopper. An additional benefit is increased tank fill, resulting in greater biowaste pumping efficiency and fewer opportunities for tracking biohazardous waste.

As shown in FIG. 1, the biohopper 12 may be attached to the top side of a tank 10, such as a tractor trailer, which may store the biowaste until it can be delivered to a biowaste facility or spread on a field as fertilizer. The biohopper 12 may receive the biowaste by any method known in the art, but as shown is pumped from a location with biowaste to be removed through a pipe and dropped from above into the biohopper 12 located on top of the tank 10.

FIGS. 2-5 show the biohopper elements in more detail. The apparatus 12 may have an inner body 20, having a first end 22 and a second end 24, wherein the first end 22 is adapted to receive biowaste and the second end 24 is adapted to direct biowaste into tank 10. The inner body 20 has an opening in the second end 24 that substantially matches an opening in the tank 10, and allows biowaste to enter the tank 10. The inner body 20 may be attached to the tank 10 in any manner known in the art, such as bolt connections (not shown) or welding.

The biohopper 12 may further have an outer body 30, having a first end 32 and a second end 34. The first end 32 is adapted to receive biowaste overflow from the inner body 20. The overflow may occur because the biowaste is received into the apparatus 12 faster than the inner body 20 can direct the biowaste into the tank 10. The biowaste may then build up within the inner body until it falls over the first end 22 of the inner body 20. The second end 34 of the outer body 30 is fastened to the second end 24 of the inner body 20. The outer body 30 may encompass or surround the inner body 20.

The outer body 30 may be adapted to deliver biowaste overflow into the tank 10 through a pipe 36 (see FIGS. 1 and 7) that extends from a side wall of the outer hopper 30. The pipe 36 may have an inlet 36a in the outer body 30 and an outlet 36b in a top side of the tank 10. The pipe 36 may be attached to the outer body and the tank 10 in any manner known in the art. In this fashion, biowaste that may fall out of the inner body 20 is still delivered to the tank 30 and prevented from spilling onto the ground, and a user may not need to slow the flow of biowaste into the apparatus 12, making the system more efficient.

The inner body 20 and the outer body 30 may be made of a variety of materials, preferably metal, and most preferably a metal that will withstand heavy use and will not rust. In exemplary embodiments, the metal is powder-coated black iron. In alternate embodiments, the metal includes, but is not limited to, stainless steel. Additional suitable materials will be understood by those of skill in this field.

In certain embodiments, the first end 32 of the outer body 30 is rectangular, and the rectangular first end 32 slopes inwardly toward the second end 34. The first end 32 can extend perpendicular to the tank body 10 for a short distance, creating a lip 39 before the body slopes inwardly toward the second end 34. In at least one embodiment, the first end 32 of the outer rectilinear body 30 is an adequate distance from the first end 22 of the inner rectilinear body 20 so that the outer rectilinear body 30 can capture any overflow or splash from the inner rectilinear body 20.

In certain embodiments, the second end 34 of the outer body is of equal size as the inlet to the tank 10, such that biowaste overflow from the inner body 20 is funneled into the tank 10 via the outer body 30. There may also be a pipe extending from a side wall of the outer hopper 30 configured to funnel biowaste overflow into the tank 10. The second ends 22, 32, of the inner and outer body 20, 30, are each subsequently fastened to the tank 10 opening with a respective flange 28, 38. In exemplary embodiments, the apparatus 12 is flush with the opening of the tank 10. Adaptor plates could be installed to fit a variety of brand-named tanks, which may have a variety of tank opening dimensions, as would be understood by a person of ordinary skill in the art.

Figure 6:
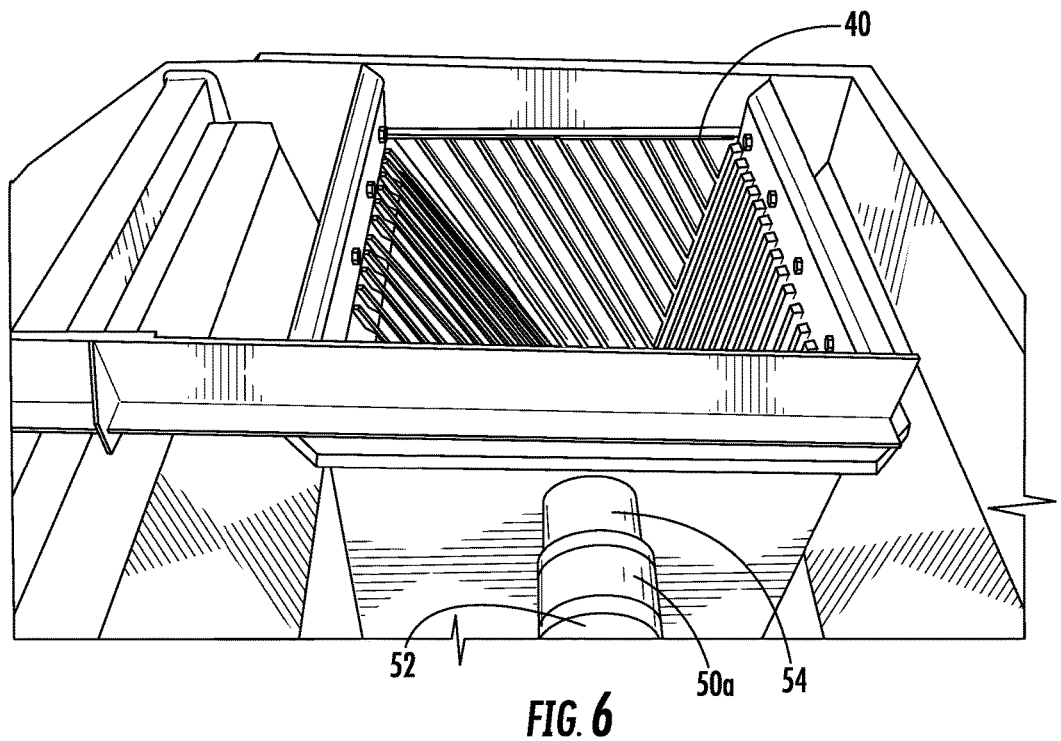
FIG. 6 is a view of the inner body and outer body of the biohopper of the present disclosure with the strainer in place.
Figure 7:
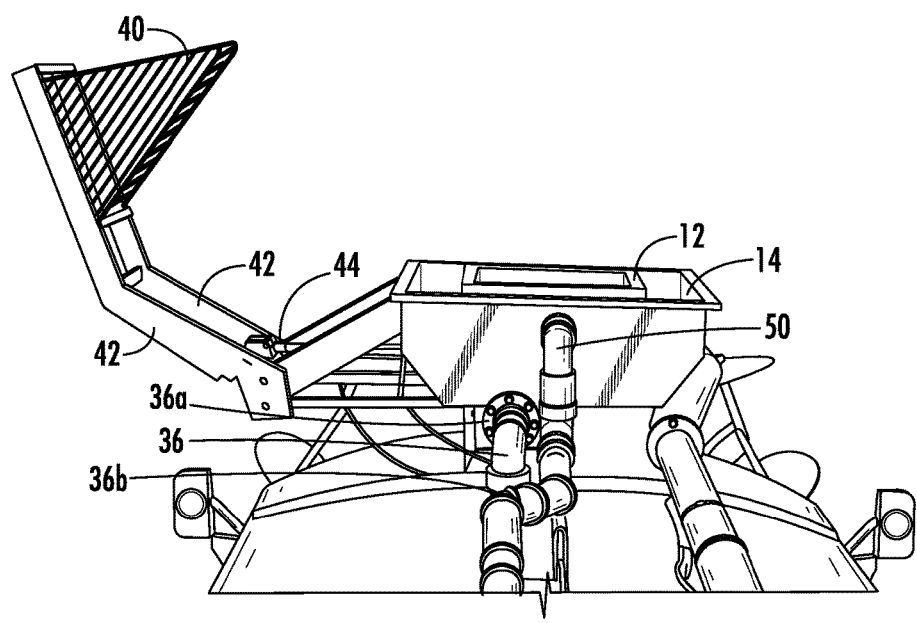
FIG. 7 is a view of the inner body and outer body of the biohopper of the present disclosure with the strainer rotated out of the inner body.
Figure 8:
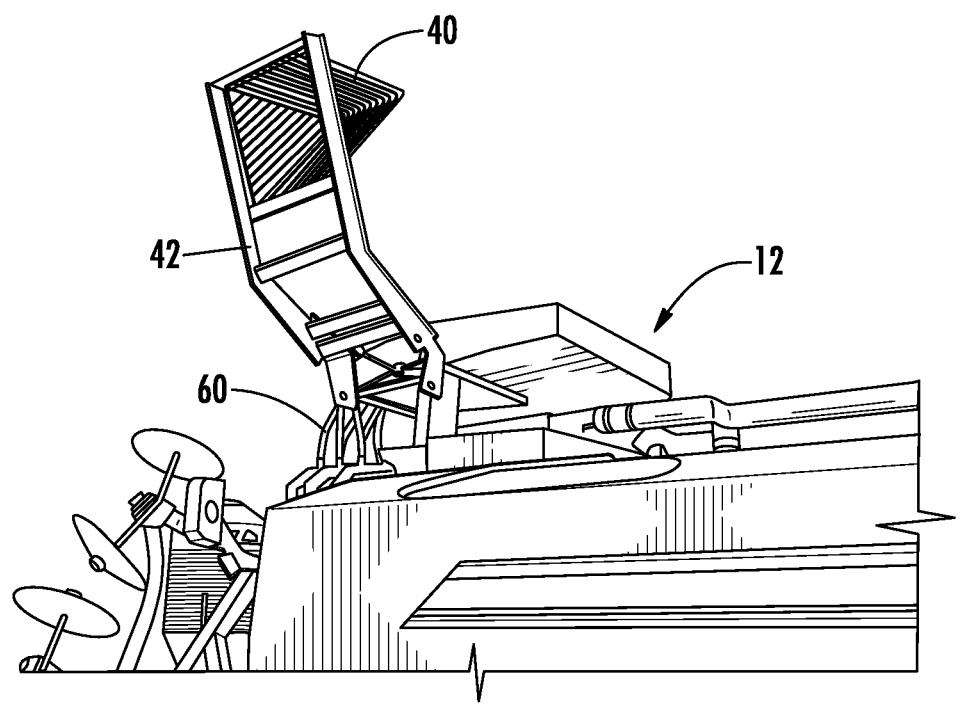
FIG. 8 is another view of the biohopper of the present disclosure with the strainer rotated out of the inner body.

In certain embodiments, as shown in FIGS. 6-8, a strainer basket 40 may be optionally inserted into the inner body 20. The strainer basket 40 may be used to remove large solid pieces such as bones and other biowaste solids, preventing flow blockage within the tank 10 during biowaste-based fertilizer application. In at least one embodiment, the strainer basket 40 can be coupled to the apparatus 12 with hinging arms 42 to facilitate the easy movement of the basket 40 in and out of the inner body 20.

The hinging arms 42 may be rotatably attached to the tank 10, the biohopper 12 itself, or any other relatively stationary structure. The hinging arms may be rotated about a hinge axis by a pair of hydraulic cylinders 44. In another embodiment, there may only be one hydraulic arm 44. In other embodiments, the strainer basket 40 might be attached in a different manner known in the art.

In an embodiment, the apparatus 12 increases air flow through the tank 10 and decreases biowaste backflow. In an embodiment, this may be accomplished by a vent pipe 50 with an inlet (not shown) on the top of the tank 10. The pipe 50 may be attached to an outer body connection 52, which is in turn connected to an inner body connection 54 through a connector pipe with an outlet in the interior of the inner body 20. The pipe 50 inlet may allow bubbling biowaste from the tank 10 to be vented through the pipe 50, and back into the hopper 12 for re-insertion. This allows the interior of the tank 10 to relieve pressure and continue allowing biowaste to be efficiently delivered to the interior of the tank 10. The hopper 12 may also have a number of vent tubes 60 on the back side to aid in the venting of the injectors.

The advantages will be readily apparent to those in this field but include the reduction of biowaste spillage and biosecurity concerns related to tracking biowaste from one farm to another. Another advantage of the present disclosure is the ability to more completely fill a biowaste tank, allowing the same quantity of biowaste to be pumped in fewer trips. In various embodiments, the present disclosure increases hauling capacity by up to ten percent by volume. In certain embodiments, the present disclosure increases hauling capacity by 3 to 5 percent by volume. In exemplary embodiments, the present disclosure increases hauling capacity to 4.5 percent by volume. Increasing the efficiency of biowaste pumping both decreases time required and decreases the risk of tracking as the number of trips back and forth from the fill station decrease. In certain embodiments, the present disclosure eliminates one in every 24-26 fills of the tank 10. In exemplary embodiments, the present disclosure eliminates one in every twenty-five tank fills. For example, the present disclosure could eliminate four tank fills for every million gallons of biowaste pumped. In addition to reducing biowaste tracking, the present disclosure also reduces fuel expense and equipment wear.

EXAMPLE 1

The inventor tested the tank fill level. Starting with an empty tank and filling the tank using a hopper without an outer hopper to catch overflow, the tank held between 8700 and 8800 gallons. The same test was performed with the present disclosure. When the present disclosure was used, the tank held between 9100 and 9200 gallons, a 300-500 gallon improvement over the other hopper. In an example where 1 million gallons of biowaste is hauled away, the apparatus without the outer hopper 30 may use 114-115 trips to redistribute the biowaste. In an embodiment, the apparatus with the outer hopper 30 may use about 109 trips, saving 5-6 trips to and from the fill station. This is a significant savings on wear and tear of the equipment, as well as fuel expense saving of up to 5%.

EXAMPLE 2

The inventor tested the number of trips required to pump 50,000,000 gallons of biowaste. The inventor compared the number of trips required one season with a hopper not configured to prevent overflow to the number of trips required the next season using the inventor's biohopper. The inventor found that using the biohopper decreased the number of trips required by 220 loads, a significant decrease from the prior year.

The foregoing description and drawings comprise illustrative embodiments of the present disclosures. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the disclosure, and the disclosure is not limited thereto, except insofar as the claims are so limited. Those skilled in the art who have the disclosure before them will be able to make modifications and variations therein without departing from the scope of the disclosure.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An apparatus for filling a biowaste tank, the apparatus comprising:
   an inner body, having a first end and a second end, wherein the first end is adapted to receive biowaste from an external source, and the second end is adapted to direct biowaste into a tank opening;
   an outer body, having a first end and a second end, wherein the first end is adapted to receive biowaste overflow from the inner body and the second end is flush with the second end of the inner body, and wherein the outer body fully encompasses the inner body;
   a flange disposed at the second end of the inner body, wherein the flange is used to fasten the second end of the inner body, the second end of the outer body, and the tank opening;
   a first pipe with an inlet configured to attach to the tank and an outlet in the inner body; and a second pipe with an inlet in the outer body, and an outlet in the tank, the second pipe configured to direct overflow biowaste from the inner body into the tank through an aperture in the tank.

2. The apparatus of claim 1, wherein the outer body is configured to reject biowaste overflow from the inner body into the biowaste tank through a pipe that extends from a side wall of the outer body.

3. The apparatus of claim 2, wherein the outer body has a rectangular first end, and wherein the rectangular first end slopes, inwardly toward the second end.

4. The apparatus of claim 3, wherein the second end of the outer body is of equal size as a tank inlet, such that biowaste overflow from the inner body is funneled into the tank inlet.

5. The apparatus of claim 3, further comprising a strainer basket removably disposed within the inner body.

6. The apparatus of claim 5, wherein the strainer basket is rotationally attached to the outer body.

7. The apparatus of claim 5, wherein the strainer basket is rotationally attached to the tank.

8. A hopper for improving inflow of biowaste into a tank, the hopper comprising:
a body assembly, the body assembly comprising:
an inner body, having a first end and a second end, wherein the first end is adapted to receive biowaste from an external source, and the second end is adapted to direct biowaste into a tank opening, wherein the inner body has a substantially square cross-section;
an outer body, having a first end and a second end, wherein the first end is adapted to receive biowaste overflow from the inner body and the second end is flush with the second end of the inner body, and wherein the outer body fully encompasses the inner body and has a substantially square top portion; and
a flange at the second end of the inner body, wherein the flange is used to fasten the second end of the inner body and the second end of the outer body to the tank;
a pipe with an inlet in the body assembly, and an outlet adapted to be attached to the tank, the pipe configured to direct overflow biowaste from the inner body into the tank through an aperture in the tank; and
a strainer basket operably coupled to the body assembly and removably disposed within the inner body.

9. The hopper of claim 8, wherein the outer body is configured to reject biowaste overflow from the inner body into the tank through a pipe that extends from a side wall of the outer body.

10. The hopper of claim 9, wherein the outer body has a rectangular first end, and wherein the rectangular first end slopes inwardly toward the second end.

11. The hopper of claim 10, wherein the second end of the outer body is of equal size as a tank inlet, such that biowaste overflow from the inner body is funneled into the tank inlet.

12. The hopper of claim 8, wherein the strainer basket is rotationally attached to the outer body.

13. The hopper of claim 8, wherein the strainer basket is rotatable by hydraulic cylinders operably attached to a pair of arms on the strainer basket.

14. The hopper of claim 13, further comprising a hydraulic cylinder and wherein the hydraulic cylinder is attached at one end to the body assembly, and at a second end to a connecting bar coupled to the pair of arms.

15. The hopper of claim 14, wherein the strainer basket has a first position substantially within the inner body, an open top portion to allow biowaste to enter the inner body, and a substantially triangular strainer portion that allows biowaste to flow through but prevents larger pieces from advancing into the tank.

16. The hopper of claim 15, wherein the strainer basket has a second position substantially removed from the inner body wherein the large pieces that were prevented from advancing into the tank may be disposed of by the use of gravity.

17. A method for filling a biowaste tank comprising the steps of:
directing biowaste into an inner body disposed above and attached to an aperture in a biowaste tank;
catching an amount of overflow biowaste over a top of the inner body with an outer body that substantially surrounds the inner body and shares a common attachment to the aperture;
directing the amount of overflow biowaste into the tank through a pipe having an inlet in the outer body and an outlet configured to attached to the tank; and
increasing the air flow through the tank and decreasing the backflow of the biowaste.

18. The method of claim 17 further comprising the steps of:
straining the biowaste to remove large pieces with a removable strainer within the inner body; and
emptying the large pieces by rotating the strainer out of the inner body.

19. The method of claim 17, wherein the method increases hauling capacity by up to 10 percent by volume.

* * * * *